United States Patent
Roth et al.

(10) Patent No.: US 11,287,279 B2
(45) Date of Patent: Mar. 29, 2022

(54) METHOD FOR IDENTIFYING A SUITABLE PARKING SPACE, MOTOR VEHICLE, AND SERVER

(71) Applicant: AUDI AG, Ingolstadt (DE)

(72) Inventors: Erwin Roth, Wolnzach (DE); Florian Schuller, Ismaning (DE); David Lenz, Munich (DE); Pascal Minnerup, Munich (DE); Chao Chen, Munich (DE)

(73) Assignee: Audi AG, Ingolstadt (DE)

( * ) Notice: Subject to any disclaimer, the term of this patent is extended or adjusted under 35 U.S.C. 154(b) by 714 days.

(21) Appl. No.: 15/562,243

(22) PCT Filed: Mar. 4, 2016

(86) PCT No.: PCT/EP2016/000389
§ 371 (c)(1),
(2) Date: Sep. 27, 2017

(87) PCT Pub. No.: WO2016/155865
PCT Pub. Date: Oct. 6, 2016

(65) Prior Publication Data
US 2018/0058878 A1 Mar. 1, 2018

(30) Foreign Application Priority Data
Apr. 2, 2015 (DE) ..................... 10 2015 004 369.2

(51) Int. Cl.
*G01C 21/00* (2006.01)
*G01C 21/36* (2006.01)
(Continued)

(52) U.S. Cl.
CPC ..... *G01C 21/3685* (2013.01); *G01C 21/3407* (2013.01); *G08G 1/096827* (2013.01);
(Continued)

(58) Field of Classification Search
CPC .. G01C 21/3685; G01C 21/3407; G08G 1/16; G08G 1/146; G08G 1/096838; G08G 1/096827; G08G 1/143
See application file for complete search history.

(56) References Cited

U.S. PATENT DOCUMENTS

| 6,745,123 B1 | 6/2004 | Petzold et al. |
| 7,012,550 B2 * | 3/2006 | Iwakiri ................ B62D 15/027 340/932.2 |

(Continued)

FOREIGN PATENT DOCUMENTS

| CN | 102027318 A | 4/2011 |
| CN | 102971775 A | 3/2013 |

(Continued)

OTHER PUBLICATIONS

International Preliminary Report on Patentability directed to related International Patent Application No. PCT/EP2016/000389, dated Oct. 3, 2017, with attached English-language translation; 16 pages.

(Continued)

*Primary Examiner* — Ian Jen
(74) *Attorney, Agent, or Firm* — Sterne, Kessler, Goldstein & Fox P.L.L.C.

(57) ABSTRACT

A method is disclosed for identifying an appropriate parking space for a motor and a route leading thereto for a motor vehicle having a navigation system, wherein at least one collision-free route is calculated on the basis of at least one piece of information that is related to a search for a parking space and that is requested from at least one external server, which manages at least one parking lot having at least one parking space, before the motor vehicle reaches the parking lot. A motor vehicle with a navigation system and an external server, for execution of the method, are also disclosed.

14 Claims, 1 Drawing Sheet

(51) Int. Cl.
*G08G 1/14* (2006.01)
*G01C 21/34* (2006.01)
*G08G 1/0968* (2006.01)
*G08G 1/16* (2006.01)

(52) U.S. Cl.
CPC ....... *G08G 1/096838* (2013.01); *G08G 1/143* (2013.01); *G08G 1/146* (2013.01); *G08G 1/16* (2013.01)

(56) References Cited

U.S. PATENT DOCUMENTS

| | | | | |
|---|---|---|---|---|
| 8,583,361 | B2* | 11/2013 | Lewis | G07C 5/0841 |
| | | | | 701/408 |
| 8,756,000 | B2* | 6/2014 | Tertoolen | G01C 21/3682 |
| | | | | 701/400 |
| 8,816,880 | B1* | 8/2014 | Foster | G08G 1/146 |
| | | | | 340/932.2 |
| 9,061,102 | B2* | 6/2015 | Levien | G05D 1/102 |
| 9,195,230 | B2* | 11/2015 | McClain | B62D 13/06 |
| 9,222,795 | B1* | 12/2015 | Gerlach | G01C 21/3415 |
| 9,299,257 | B2* | 3/2016 | Beaurepaire | G01C 21/3685 |
| 9,371,007 | B1* | 6/2016 | Penilla | G07F 15/005 |
| 9,429,943 | B2* | 8/2016 | Wilson | G05D 1/0088 |
| 2008/0165030 | A1 | 6/2008 | Juo et al. | |
| 2011/0063132 | A1 | 3/2011 | Trum | |
| 2012/0188100 | A1* | 7/2012 | Min | E04H 6/426 |
| | | | | 340/932.2 |
| 2013/0325565 | A1 | 12/2013 | Toussaint | |
| 2015/0213715 | A1 | 7/2015 | Schulz | |

FOREIGN PATENT DOCUMENTS

| | | |
|---|---|---|
| CN | 104282174 A | 1/2015 |
| DE | 19930796 A1 | 1/2001 |
| DE | 102009042627 A1 | 4/2011 |
| DE | 102012218334 A1 | 6/2014 |
| DE | 102013107959 A1 | 1/2015 |
| JP | 2012141664 A | 7/2012 |
| WO | WO99/60231 A1 | 11/1999 |
| WO | WO2011/138035 A1 | 11/2011 |
| WO | WO2012/141665 A1 | 10/2012 |

OTHER PUBLICATIONS

English-language abstract of International Patent Application Publication No. WO9960231 A1, published Nov. 25, 1999; 1 page.
English-language abstract of German Patent Application Publication No. 10 2013 107 959 A1, published Jan. 29, 2017; 2 pages.
English-language abstract of Japanese Patent Application Publication No. 2012-141664 A, published Jul. 26, 2012; 1 page.
English-language abstract of German Patent Application Publication No. 10 2009 042 627 A1, published Apr. 28, 2011; 2 pages.
International Search Report and Written Notice of the International Searching Authority directed to related International Patent Application No. PCT/EP2016/0003 89, dated Jun. 2, 2016, with attached English-language translation; 25 pages.
Chinese Application No. 201680020769.7, Office Action dated Apr. 26, 2020; English Translation from EPO Global Dossier, 10 pages.

* cited by examiner

METHOD FOR IDENTIFYING A SUITABLE PARKING SPACE, MOTOR VEHICLE, AND SERVER

TECHNICAL FIELD

The invention relates to a method for identifying an appropriate parking space for a motor vehicle and a route leading thereto. The invention also relates to a motor vehicle having a navigation system designed for execution of the method. In addition, the invention relates to a server having at least one communication device designed to communicate with at least one navigation system in a motor vehicle for execution of the method.

BACKGROUND

Parking assistance systems and operating procedures for motor vehicles that assist the driver of a motor vehicle to park in parking spaces or garages and/or to maneuver out of parking spaces or garages are known. Likewise, it is known in the state of the art that motor vehicles are equipped with navigation systems which, together with a control system, allow for piloted, i.e., autonomous, partially autonomous, or assisted, driving.

However, the saved road sections for a navigation system normally present in motor vehicles do not include any detailed information for identifying a route within parking lots such as car parks, parking spaces, or private properties that can be reached from the public road network. The storage of detailed information concerning all such parking lots would require large quantities of memory in the navigation system, even if it were limited to a single state or a single city. Furthermore, in order to keep the database up to date, a connection to a server, which would likewise generate high levels of data traffic, would be required.

BRIEF DESCRIPTION OF THE DRAWINGS/FIGURES

DETAILED DESCRIPTION

Figure 1:
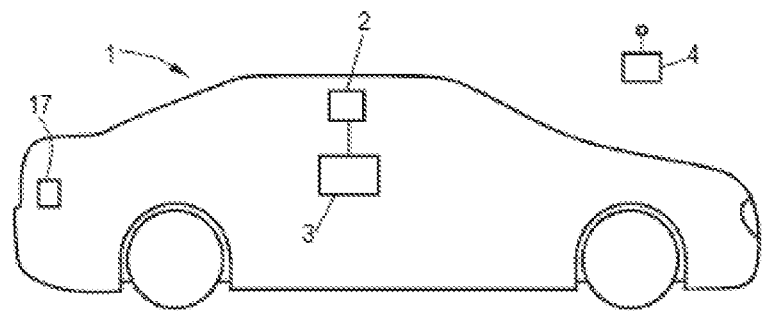
FIG. 1 illustrates a schematic representation of a side view of a motor vehicle that has an electric charging connection, a control system, and a navigation system designed to communicate with an external server.

It is the object of the present invention to provide an improved method for identifying an appropriate parking space for a motor vehicle and a route leading thereto.

This objective is achieved through a method comprising the following steps:

Requesting, by the navigation system in the motor vehicle, at least one piece of information regarding a parking place search from at least one external server that manages at least one parking lot having at least one parking space, before the parking lot is reached;

Sending at least one piece of information requested from the external server to the navigation system in the motor vehicle;

Executing, by the navigation system, a route search from a start node to a destination node, in which an initial basic reachability verification for at least one destination node from at least one start node is determined;

Identifying at least one section of the route that is required in order to reach at least one destination node from at least one start node;

Executing a second reachability verification that is more detailed in at least one testing characteristic than the initial reachability verification, and a specific suitability test for at least one parameter of the motor vehicle of at least one parking space in the parking lot;

Loading at least one identified route section from the external server into the motor vehicle's navigation system; and Calculating a collision-free route from the start node to the destination node.

The invention is based on the idea that, using the multi-stage method according to the invention, information is exchanged with an external server before the parking lot is reached in order to verify the reachability of the corresponding parking space on the basis of the vehicle-specific property. Here, "server" can be understood to mean any map server or any control system for the corresponding parking lot. The use of multiple servers at the same time is also possible, wherein each server is allocated specific parking spaces or parking lots. In the context of this application, "parking lot" is understood to mean all of the parking spaces that have a certain connection, for example, spatial. Here, for example, "parking lot" can be understood to mean a car park to which the individual parking spaces in the car park are allocated. The totality of the parking spaces thus constitutes the car park, therefore the parking lot.

It is further intended, according to the invention, that the level of detail in the information exchanges between the vehicle and the server increases with each step. This offers the advantage that parking lots or individual parking spaces in a parking lot that are not suitable for parking need not to be considered even at an early stage in the method. This reduces the data volumes and the data traffic between the navigation system and the server.

Initially, in the method according to the invention, at least one piece of information concerning a parking space search is requested from the external server. This is done by the navigation system in the motor vehicle, which is thus designed for two-way communication with at least one server. The request is made before the parking lot is reached, so that it is possible to carry out a verification that provides conclusions as to whether there is a parking space available for the motor vehicle in the corresponding parking lot in advance and before the parking lot is reached. The request can be initiated in a number of ways. For example, a user can trigger the request by entering into the navigation system where the user wants to park. Furthermore, it is possible to trigger a request through geographical proximity of the motor vehicle or of a navigation destination in the navigation system to a corresponding parking lot. In addition, movement profiles are possible that take into account the habits of a user of the motor vehicle with regard to parking spaces used. In this step of the method, it is also possible for multiple servers to be queried regarding available parking spaces.

Here, it can in particular be intended that the request contains at least one piece of information concerning what vehicle class or what approximate dimensions a parking space should offer for the motor vehicle, or which are allowed by the route thereto.

In a further step of the method, the information requested by the navigation system is sent from the external server to the navigation system in the motor vehicle. In particular, all parking spaces or only free or available parking spaces, for example, can be displayable or conveyable.

A route search that determines a route from a start node to a destination node is performed, based on the information transmitted, by the navigation system. Here, an initial basic reachability verification for at least one destination node from at least one start node is established. The route comprises individual route sections that run between individual nodes. The individual route segments that are determined for reaching the destination node from the start node are subsequently displayed as a route or as a graph. This step of the method according to the invention preferably provides a sorted list of segments that are required or available in order to reach the destination node from the start node as a result.

At least one section of the route that is required in order to reach at least one destination node from at least one start node is thus identified. A second reachability verification, which is more detailed than the initial reachability verification in at least one testing characteristic, can then be performed. On the basis of this reachability verification, detailed route sections, which may contain details regarding the geometric shape of the sections and/or a reference path within the route section or their localization in relation to the parking lot, can be obtained from the server. During the course of this second reachability verification, the dimensions or individual properties of the motor vehicle can also be assessed in more detail. In addition, within this step of the method according to the invention, specific suitability testing of at least one parking space in the parking lot can be carried out for at least one parameter of the motor vehicle. During the course of this suitability testing, it is possible to verify whether the corresponding parking space in the parking lot is suitable for the motor vehicle. Here, it is also possible in particular to take into account whether the motor vehicle has special parameters, and whether it requires a charging connection or other facilities, for example, which are preferably provided by the parking space.

The next step in the method according to the invention intends that at least one route section identified is loaded from the external server into the navigation system in the motor vehicle. The necessary route section or route sections are thus available so that at least one collision-free route can be calculated in the last step of the method according to the invention. As far as this is concerned, the transit route can be calculated from start node to destination node. Likewise, local parking or maneuvering can be taken into account in the route as a part of the route. In particular, more than one route can be calculated, wherein the multiple routes can therefore be weighted or sorted in turn with regard to a user preference or with regard to other optimization parameters, for example a cost function, the journey time, or the maneuvering required for navigation of the corresponding route.

According to the invention, the geometry data for the car park is thus compared with the geometry data for the motor vehicle, and suitability testing of the parking space and reachability verification for the same are thus carried out. In particular, specific motor vehicle parameters and the precise dimensions of the car park can be used for the reachability verification. The wheelbase, wheel gage, and exterior dimensions of the motor vehicle are examples of such motor vehicle parameters.

Particularly preferably, in the method according to the invention, a current location of the motor vehicle or an arrival point for the motor vehicle in a parking lot as determined by the navigation system is used as the start node. This offers the benefit that a route can be calculated directly from the current location from which the request to the server is made.

Furthermore, it is particularly beneficial for a parking space or a desired target position of the motor vehicle within a parking space to be used as the destination node. It is thus possible for the vehicle to be guided from the current location to the desired parking space, or for an appropriate route to be calculated. In particular, a target position for the motor vehicle within the parking space can be used as the destination node here, which offers the advantage that the orientation of the motor vehicle in the parking space or a position relative to the parking space can also be selected as the destination node. This is beneficial in particular with regard to facilities that are provided at the corresponding parking space. For example, an electric vehicle can take into account an arrangement of a charging connection with regard to a charging point or charging station available at the parking space through the target position of the motor vehicle within a parking space.

Furthermore, the target position within a parking space can be determined on the basis of at least one detailed route section and/or a geometric factor and/or a position of a loading ramp and/or a position of a charging device and/or a user preference. The target position or the destination node that concerns the target position within a parking space can thus be determined by the user or on the basis of a factor available at the parking space or a parameter of the parking space.

The method according to the invention can furthermore be refined insofar as at least one route section includes at least one piece of information that concerns at least one geometry of the road and/or a reference path and/or a localization of the route section in the parking lot and/or a sensor modality and/or a parking space and/or an item of fleet data and/or an impediment and/or an available room to maneuver. It is therefore possible to ensure, depending on the relevant motor vehicle for which a parking place is sought, that the parking space found is also reachable. In particular, for motor vehicles for which the dimensions exceed those of common motor vehicles, for example owing to spoilers, attachments, or larger dimensions relating to the vehicle class, it is possible to ensure that the route to the corresponding parking space is also navigable. In particular, with regard to the turning circle or the exterior dimensions of the motor vehicle, it is thus possible to avoid stopping at a parking space that cannot be reached.

It is possible here for the navigation of the calculated route to occur semi-autonomously, autonomously, or manually. First, a control system in the motor vehicle can generate commands, based on the data from the navigation system, in order to steer the motor vehicle along the calculated route autonomously, i.e., piloted, and preferably to park it. It is likewise possible for the task of driving to be largely removed from the driver by means of a semi-autonomous operating mode so that, for example, the driver drives the motor vehicle through the car park to the appropriate parking space and the control system autonomously parks the motor vehicle there. Likewise, it is possible for the parking procedure or the transit process from the start node to the destination node to be supported by appropriate assistance systems. It is likewise possible for the driver to manually control the motor vehicle and for the navigation system to simply provide information concerning the route through the car park or parking lot.

Particularly preferably, in the method according to the invention, the request from the navigation system contains at least one filter criterion that is specific to the motor vehicle. In particular, the road width, both required and available, the perceptive capacities with regard to the sensor coverage or triggering of the available sensors, and time availability for the corresponding parking space can be taken into account here. Of course, this list is not exhaustive, but should rather be considered to be exemplary, and all other parameters that provide conclusion regarding the reachability or availability of a parking space can also be used.

A development of the method according to the invention could consist of pre-filtering in which at least one piece of information to be transmitted to the navigation system in the motor vehicle in accordance with at least one specific property of the motor vehicle is carried out in the external server. This offers the advantage that the data volume between the navigation system and the server can be further reduced, since pre-filtering of the appropriate parking spaces or parking lots that can be excluded owing to collision-free reachability for the motor vehicle can already be carried out on the server.

Particularly preferably, in the method according to the invention, the motor vehicle is moved autonomously, semi-autonomously, or manually from the start node to the destination node.

In addition, the invention relates to a motor vehicle with a navigation system that is designed for execution of the method according to the invention.

Furthermore, the invention relates to a server with at least one communication device that is designed to communicate with at least one navigation system in a motor vehicle, wherein the server is designed for execution of the method according to the invention.

Naturally, all particulars and characteristics of the method according to the invention are transferable both to the motor vehicle according to the invention and to the server according to the invention.

Figure 2:
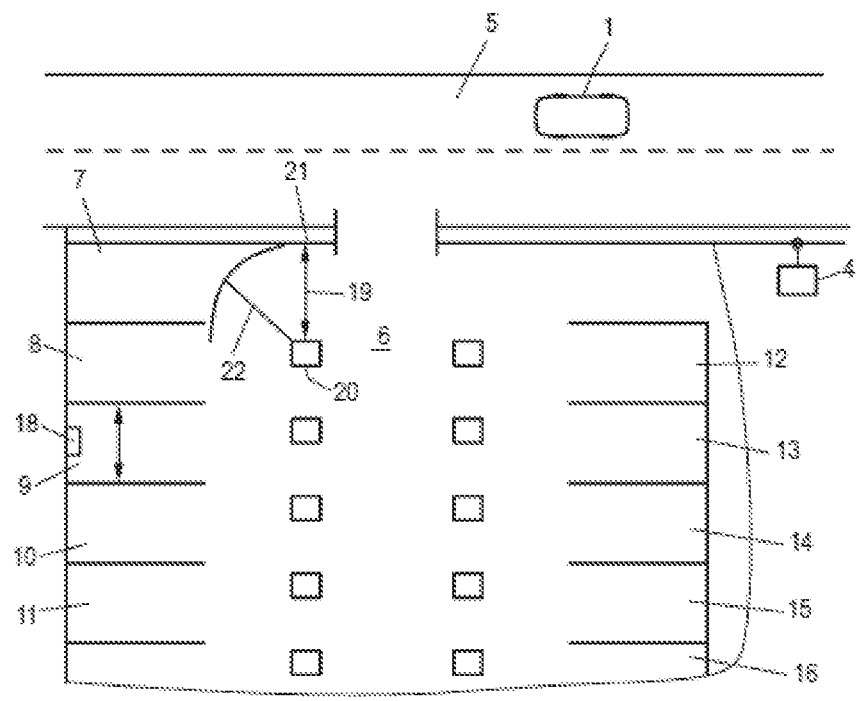
FIG. 2 illustrates a schematic representation of a plan view of the motor vehicle from FIG. 1 in a first traffic situation.

The invention will now be explained in greater detail by means of an embodiment with reference to the drawings. The drawings are schematic representations and show:

in FIG. 1, a side view of a motor vehicle according to the invention; and in FIG. 2, a plan view of the motor vehicle according to the invention from FIG. 1 in a first traffic situation.

FIG. 1 shows a motor vehicle 1 with a navigation system 2 and a control system 3. The navigation system 2 is connected to the control system 3. The control system 3 is designed to control various functions and features of the motor vehicle 1, in particular those that are required for autonomous movement of the motor vehicle 1. The navigation system 2 is designed to communicate with an external server 4 that manages multiple parking spaces in a parking lot. The external server 4 can therefore transmit information to the navigation system 2 concerning whether a parking space is available for the motor vehicle 1 in the corresponding parking lot.

FIG. 2 shows the motor vehicle 1 from FIG. 1 in a plan view. The motor vehicle 1 is located on a road section 5 some distance away from a parking lot 6, which constitutes a car park according to this embodiment. Thus, even before reaching the parking lot 6, the user initiates the sending of a request to the external server 4, which manages the parking spaces in the parking lot 6 through an appropriate entry in the navigation system 2. Here, the user input includes the information that the user of the motor vehicle 1 wants to park in one of the parking spaces of the parking lot 6. This request can be sent long before reaching the parking lot, when the vehicle is still relatively far away from the parking lot. In the first step of the method described, the request simply consists of the availability in principle of a parking space that is suitable for the dimensions of the motor vehicle 1, and its reachability in principle. The external server 4 thus checks, based on the dimensional data or the data from the motor vehicle 1, which is required for calculation and which is transmitted by the navigation system 2, whether an appropriate parking space is available and whether it is also reachable. According to this embodiment, the navigation system transmits the vehicle class of the motor vehicle 1 to the server 4.

The external server 4 then sends the available parking spaces 7 to 16, which are all accessible for the vehicle class transmitted by the navigation system 2, to the navigation system 2 in the motor vehicle 1.

The navigation system then performs a route search from a start node to the destination nodes. According to this embodiment, the start node is the current location of the motor vehicle 1 on the road section 5. The destination nodes here are the parking spaces 7 to 16, which are available in the parking lot.

The navigation system 2 then determines the route sections that are required from the start node until the destination nodes are reached.

The navigation system 2 then transmits more detailed parameters for the motor vehicle 1 to the external server 4 in order to carry out a second reachability verification that is more detailed than the initial reachability verification in at least one testing characteristic. Here, this refers explicitly to the precise dimensions of the motor vehicle 1, as well as its wheelbase or its turning circle. Furthermore, the motor vehicle 1 according to this embodiment is an electric vehicle that has a charging connection 17 that can be connected to a charging station 18 in order to charge the battery of the motor vehicle 1. The navigation system 2 thus transmits the precise position of the charging connection 17 to the external server 4 so that this can be taken into account in the suitability testing of at least one parking space 7 to 16. On the strength of this, the external server 4 performs the second reachability verification and suitability testing, in which the distance 19 between a pillar 20 and a wall 21 in the parking lot 6 is taken into account in particular. Here, the distance 19 allows for navigation by the motor vehicle 1 because the motor vehicle 1 has dimensions that are smaller than the distance 19. From the wheelbase of the motor vehicle 1 and its turning circle, which are transmitted to the external server 4 by the navigation system 2, the external server 4 determines whether the turning circle is sufficient to navigate the radius that is indicated with the reference numeral 22. Since this is also the case, all of the parking spaces 7 to 16 can be reached by the motor vehicle 1 in principle.

Finally, it is taken into account in the suitability testing that the motor vehicle 1 has a charging connection 17, which can be coupled to the charging station 18. As a result, the parking space 9, which has such a charging station 18, is identified.

This is transmitted to the navigation system 2 in the motor vehicle 1, whereupon it loads the route sections that are required in order to reach the parking space 9, which is defined as the destination node, from the external server 4. In particular, the orientation of the motor vehicle in the parking space 9 is determined such that the charging connection 17 can be connected to the charging station 18.

The navigation system then calculates at least one collision-free route from the start node, which is located on the road section 5, i.e., the current position of the motor vehicle 1, to the destination node, i.e., the target position within the parking space 9.

From the collision-free routes calculated, the optimal route with regard to journey time, the maneuvers required, and the total costs is then selected. According to this embodiment, the transit routing from the start node to the destination node, parking, and subsequent maneuvering are done autonomously.

The invention claimed is:

1. A method for identifying an appropriate parking space for a motor vehicle and a route leading thereto, comprising:
   requesting, by a navigation system in the motor vehicle, a piece of information regarding a parking place search from an external server that manages a parking lot having at least one parking space, before the parking lot is reached, wherein the parking lot is selected based on geographic proximity of the motor vehicle to the parking lot;
   sending the piece of information to the navigation system in the motor vehicle;
   executing, by the navigation system, a route search from a start node to a destination node, in which an initial basic reachability verification for the destination node from the start node is determined;
   identifying a route section that is required in order to reach the destination node from the start node;
   executing a second reachability verification, and a specific suitability test of the at least one parking space in the parking lot based on at least one parameter of the motor vehicle, wherein the second reachability verification is different from the initial basic reachability verification, and wherein the second reachability verification comprises assessing dimensions of the motor vehicle;
   loading a detailed route section identified from the external server to the navigation system in the motor vehicle; and
   calculating a collision-free route from the start node to the destination node.

2. The method of claim 1, wherein a current location of the motor vehicle or a point of arrival to the parking lot determined by the navigation system is used as the start node.

3. The method of claim 1, wherein the at least one parking space or a desired target position for the motor vehicle within the at least one parking space is used as the destination node.

4. The method of claim 3, wherein the target position within the at least one parking space is determined based on the detailed route section, a geometric factor, a position of a loading ramp, a position of a charging device, or a user preference.

5. The method of claim 1, wherein the detailed route section includes a geometry of the road, a reference path, a localization of the route section in the parking lot, a sensor modality, the at least one parking space, an item of fleet data, an impediment, or an available room to maneuver.

6. The method of claim 1, wherein a navigation of the collision-free route can occur semi-autonomously, autonomously, or manually.

7. The method of claim 1, wherein the request from the navigation system includes at least one filter criterion that is specific to the motor vehicle.

8. The method of claim 1, wherein the piece of information is pre-filtered by the external server in accordance with at least one specific property of the motor vehicle.

9. A method for navigating a motor vehicle, the method comprising:
   requesting a piece of information regarding a parking place search from an external server that manages a parking lot having at least one parking space, before the parking lot is reached, wherein the request may include at least one filter criterion specific to the motor vehicle, and wherein the parking lot is selected based on geographic proximity of a navigation destination to the parking lot;
   receiving the piece of information from the external server;
   determining, and using as a start node, a current location of the motor vehicle or a point of arrival to the parking lot;
   determining, and using as a destination node, the at least one parking space or a desired target position for the motor vehicle within the at least one parking space;
   executing a route search from the start node to the destination node, in which an initial basic reachability verification for the destination node from the start node is determined by the external server;
   identifying a route section that is required in order to reach the destination node from the start node;
   requesting the external server to execute a second reachability verification, and a specific suitability test of the at least one parking space in the parking lot based on at least one parameter of the motor vehicle, wherein the second reachability verification is different from the initial basic reachability verification, and wherein the second reachability verification comprises assessing dimensions of the motor vehicle;
   loading a detailed route section identified from the external server to the navigation system in the motor vehicle; and
   calculating a collision-free route from the start node to the destination node.

10. The method of claim 9, wherein a navigation of the collision-free route can occur semi-autonomously, autonomously, or manually.

11. A method for communicating between an external server and a navigation system in a motor vehicle, wherein the external server manages a parking lot having at least one parking space, the method comprising:
   receiving, from the navigation system of the motor vehicle, a request for a piece of information regarding a parking place search before the parking lot is reached by the motor vehicle, wherein the parking lot is selected based on an input to the navigation system;
   sending the piece of information to the navigation system in the motor vehicle;
   using, as a start node, a current location of the motor vehicle or a point of arrival to the parking lot;
   using, as a destination node, the at least one parking space or a desired target position for the motor vehicle within the at least one parking space;
   executing an initial basic reachability verification for the destination node from the start node;
   identifying a route section that is required in order to reach the destination node from the start node;
   executing a second reachability verification, and a specific suitability test of the at least one parking space in the parking lot based on at least one parameter of the motor vehicle, wherein the second reachability verification is different from the initial basic reachability verification, and wherein the second reachability verification comprises assessing dimensions of the motor vehicle; and providing, to the navigation system in the motor vehicle, a detailed route section identified by the external server.

12. The method of claim 11, wherein the request from the navigation system of the motor vehicle for the piece of information includes at least one filter criterion specific to the motor vehicle.

13. The method of claim 12, wherein the piece of information is pre-filtered by the external server in accordance with at least one specific property of the motor vehicle.

14. The method of claim 11, wherein the external server sends information identifying available parking spaces to the navigation system in the motor vehicle.

\* \* \* \* \*